United States Patent [19]
Sikorski et al.

[11] Patent Number: 5,380,152
[45] Date of Patent: Jan. 10, 1995

[54] ADJUSTABLE GUIDE VANE FOR TURBINES, COMPRESSORS, OR THE LIKE

[75] Inventors: Siegfried Sikorski; Michael Schober; Reinhold Schoenacher, all of Munich, Germany

[73] Assignee: MTU Motoren-und Turbinen-Union Muenchen GmbH, Munich, Germany

[21] Appl. No.: 144,575

[22] Filed: Oct. 28, 1993

[30] Foreign Application Priority Data

Nov. 3, 1992 [DE] Germany ............................ 4237031

[51] Int. Cl.⁶ .............................................. F01D 9/02
[52] U.S. Cl. ...................................... 415/160; 415/200
[58] Field of Search ................ 415/200, 159, 160, 148

[56] References Cited

U.S. PATENT DOCUMENTS

| | | | |
|---|---|---|---|
| 2,412,365 | 12/1946 | Sollinger | 415/160 |
| 3,392,958 | 7/1968 | Penny et al. | 415/200 |
| 4,498,790 | 2/1985 | Fisher | 415/160 |

FOREIGN PATENT DOCUMENTS

| | | | |
|---|---|---|---|
| 0196450 | 10/1986 | European Pat. Off. | |
| 954637 | 11/1956 | Germany | 415/160 |
| 2644066 | 4/1977 | Germany | |
| 3710321 | 6/1988 | Germany | |
| 52-077908 | 6/1977 | Japan | |
| 63-5101 | 1/1988 | Japan | |
| 621175 | 4/1949 | United Kingdom | 415/160 |

Primary Examiner—Edward K. Look
Assistant Examiner—James A. Larson
Attorney, Agent, or Firm—W. G. Fasse; W. F. Fasse

[57] ABSTRACT

A guide vane for an axial guide baffle of an axial flow engine, such as a jet engine, is adjustable in its position about a guide vane adjustment axis extending radially to a rotational engine axis. The guide vane has a vane body and an adjustment lever extending at an angle of about 90° away from the adjustment axis. The vane body, the adjustment lever, and at least one bearing journal form an integral one piece construction either of molded fiber composite material or of forged, e.g. drop forged, metal.

15 Claims, 5 Drawing Sheets

ADJUSTABLE GUIDE VANE FOR TURBINES, COMPRESSORS, OR THE LIKE

FIELD OF THE INVENTION

The invention relates to an adjustable guide vane for axial flow engines, such as turbines, compressors, jet engines or the like.

BACKGROUND INFORMATION

Guide vanes of this type form part of an axial guide baffle or grid in which all individual guide vanes are adjustable in their position around an adjustment axis that extends longitudinally of the guide vane body, but radially relative to a longitudinal rotational axis of the respective axial flow engine. The adjustment is accomplished with an adjustment lever that extends at an angle relative to the adjustment axis.

Such axial guide baffles or grids in which the individual guide vanes or guide blades are adjusted in unison by an adjustment ring are, for example, used in high pressure compressors of modern jet engines for operating the compressor optimally within its operational limits. Current constructions of such engines comprise high pressure compressors in which the first starter stage is equipped with such an adjustable axial guide baffle carrying a plurality of guide vanes. All the guide vanes or blades of the axial guide baffle are adjusted in unison by the adjustment ring arranged concentrically in the housing.

Conventional guide blades or vanes for the axial guide baffles are made of metal and comprise the following elements in addition to the blade body, namely a bearing journal at each end of the respective blade root and corresponding bearing bushings, as well as a separate lever arm for coupling the blade body to the adjustment ring and screw connections for assembling these elements into a component of the axial guide baffle. In a four stage compressor having a total of about 150 guide vanes or blades, it becomes quite apparent that a large number of individual elements are necessary for assembling these guide baffles or grids. An additional drawback of conventional structures of this type is seen in the fact that manufacturing tolerances result in an installation tolerance in which certain nonuniformities, for example, of the adjusted blade angle in a stage are unavoidable. Such nonuniformities in the adjusted blade angle in turn causes a nonuniform fluid flow into the next following rotor stage.

European Patent Publication 0,196,450 (Thomzik et al.), published on Oct. 8, 1986, discloses a controller for a twisted fluid flow in which the individual guide vanes are made of sheet metal, whereby each sheet metal blade has an integral tail end that is formed as an adjustment or entraining frame. The entraining frame is formed by sheet metal stamping so that a tongue is stamped out of the frame portion and the tongue becomes part of the axial support of the sheet metal blade. The entraining frame carries an adjustment pin which cooperates with an adjustment ring. Although the sheet metal stamping provides a simple construction that may be satisfactory for ventilating fans or the Like, it is unsuitable for the construction of jet engines or the like, because the sheet metal construction does not assure the required operational safety of high performance engines, such as jet engines.

Another publication "Patent Abstracts of Japan", JP-63-5101(A) (Ichikawa), published on Jan. 11, 1988, discloses a moving vane provided with a platform constructed of prepreg fiber composite material, which has been compressed and formed to shape the blade together with the blade body and the platform. Such vanes are used in industrial gas turbines or the like. After the prepreg layers are stacked, they are compressed and formed by a hot press. The entire composite component is formed of plane fiber reinforced prepreg layers or plies, whereby the fiber orientation is particularly selected for rotor blades which have a typical fiber orientation which takes into account the bending and torsion loads to which such rotor blades are exposed in operation. Such fiber orientation is not suitable for use in guide vanes or blades because the latter are exposed to different load combinations as compared to rotor blades.

OBJECTS OF THE INVENTION

In view of the above it is the aim of the invention to achieve the following objects singly or in combination:

to provide a new guide vane construction in which the number of the individual elements of an axial guide baffle is substantially reduced, thereby also reducing the structural weight of such baffles, as well as the assembly effort and expense, while simultaneously assuring the uniform qualities that are necessary for a safe and uniform operation of modern high performance axial flow engines;

to construct the adjustment lever arm of a guide vane and the blade body as a unitary single piece structural component made either of fiber composite material or as a drop forged single metal piece;

to construct such a single piece component in such a way that the junction point between the adjustment arm and the blade body is normally free of torsion loads by making sure that the aerodynamic pressure on the guide vane or body in its adjusted position is effective on the adjustment axis; and to avoid or at least minimize problems that occur due to different temperature expansion coefficients in different areas of the blade assembly.

SUMMARY OF THE INVENTION

The single piece integral construction of the blade body and adjustment lever arm according to the invention is characterized in that the adjustment arm and the blade body are made as an integral single piece fiber composite component or as a forged, for example drop forged, single piece integral component, and so that at least one coaxial bearing journal is provided at the radially outer end of the adjustment axis, whereby the bearing journal extends coaxially with the adjustment axis, and wherein the adjustment lever merges into the bearing journal, preferably where the blade body is positioned. The fibers of the fiber composite material of the adjustment lever extend at least partially into the blade body and form a composite bond with the fibers of the blade body.

The single piece integral guide vane according to the invention has the advantage that the number of individual elements has been substantially reduced so that these elements no longer need to be separately manufactured. Additionally, the assembly effort and expense have been correspondingly reduced since individual elements no longer need to be separately assembled. Further, the operational safety has been increased since separate connections have been eliminated, especially the conventionally used screw connections, whereby the inspection effort and expense is reduced, because individual screw connections that are not present need not be inspected. Further, the number of individual elements to be kept in stock has also been substantially reduced, which results in corresponding savings for the stock maintenance. Another important advantage of the invention is seen in that it has eliminated the heretofore unavoidable nonuniform blade adjustments due to play and adjustment tolerances in the point of connection between the blade body and the adjustment lever arm. Axial flow engines equipped as taught herein can now be operated with a higher efficiency. A further simplification has been achieved, particularly with the integration of the bearing journal into the portion of the adjustment lever arm located next to the blade root of the blade body. All these advantages have been achieved by the integration of the blade body, the adjustment lever arm, and the bearing journal that provide a single piece integral structural component.

In a further embodiment of the invention the connecting portion of the adjustment lever arm for coupling with the blade adjustment device, such as an adjustment ring, is also an integral component of the adjustment lever arm. This connecting portion may, for example, be constructed as a stud or pin for engaging an adjustment ring or as a bore in which an adjustment ring element is engaged.

In the preferred embodiment the guide vane is produced as a fiber composite component. A suitable fiber composite material is, for example, carbon fiber reinforced composite material (CFC). Due to the significant anisotropic material characteristics of fiber composite materials it is possible to transfer the occurring operational loads from the blade body into the blade bearing journals and into the adjustment lever arm in an optimal manner. These anisotropic characteristics also assure a sufficient strength and stiffness of the integral component while keeping its weight low. An especially low weight construction is achieved by using the above mentioned CFCs. The connection portion between the adjustment arm and the blade body is formed primarily by the bearing journal which is subject to torsion loads. These torsion loads can, however, be easily controlled by giving the connecting portion and thus the bearing journal the required configuration and dimensions, whereby an efficient load transfer is achieved while keeping tension peaks low. In order to reduce torsion loads on the blade as much as possible, the arrangement is such that the aerodynamic pressure point of the guide blade is located on the adjustment axis in the adjusted or operational position of the blade. When the blade is in positions outside the adjusted operational point, a substantial torque moment may be caused by the air flow loads around the adjustment axis which is the longitudinal axis of the individual blade that extends radially relative to the rotational axis of the engine. This torque moment must be safely introduced through the adjustment lever arm into the adjustment mechanism, that is, into the adjustment ring. The just mentioned torque moment causes, in the adjustment lever arm which extends approximately perpendicularly to the adjustment axis, a bending moment. By forming the blade of a compound of three-dimensionally braided fiber materials, having a unidirectional or bi-directional fiber orientation, it is possible to take up the just mentioned bending moment by the adjustment lever in an optimal manner. The individual fibers are loaded by the bending moment with tension loads or compression loads which is advantageous.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
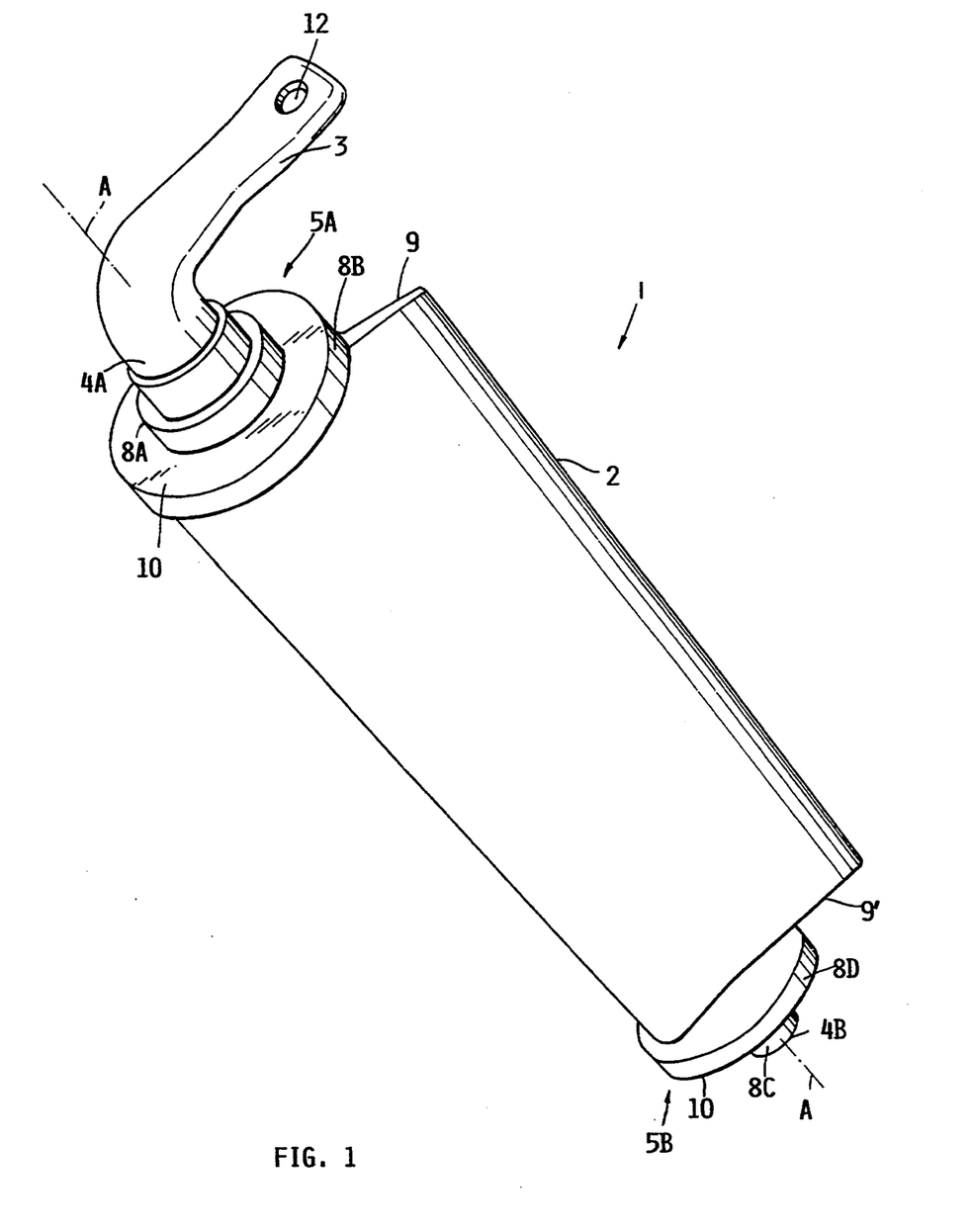
FIG. 1 is a perspective view of a guide vane or blade with bearing bushings and an integral adjustment lever.

FIG. 1 shows a perspective view of a guide vane 1 according to the invention made of fiber composite material, for example, carbon fiber reinforced synthetic material. A plurality of such guide vanes 1 are assembled in an axial guide baffle 14 for axial flow engines. The guide vane 1 comprises a blade body 2 and an adjustment lever aim 3 formed with the blade body 2 as a single piece integral structural component which has an adjustment axis A—A. A neck 4A coaxial with the adjustment axis A—A merges integrally into the blade body 2 and into the adjustment arm 3. A coaxial stud 4B at the opposite end also merges integrally into the blade body 2. The neck 4A and the stud 4B form axially aligned bearing journals. The neck or bearing journal 4A is surrounded by an upper bearing bushing 5A. The lower stud or bearing journal 4B is surrounded by a bearing bushing 5B. As shown, the adjustment lever arm 3 extends in the same angular direction as the blade body 2. However, the arm 3 may have an angular orientation different from that of the blade 2.

Figure 2A:
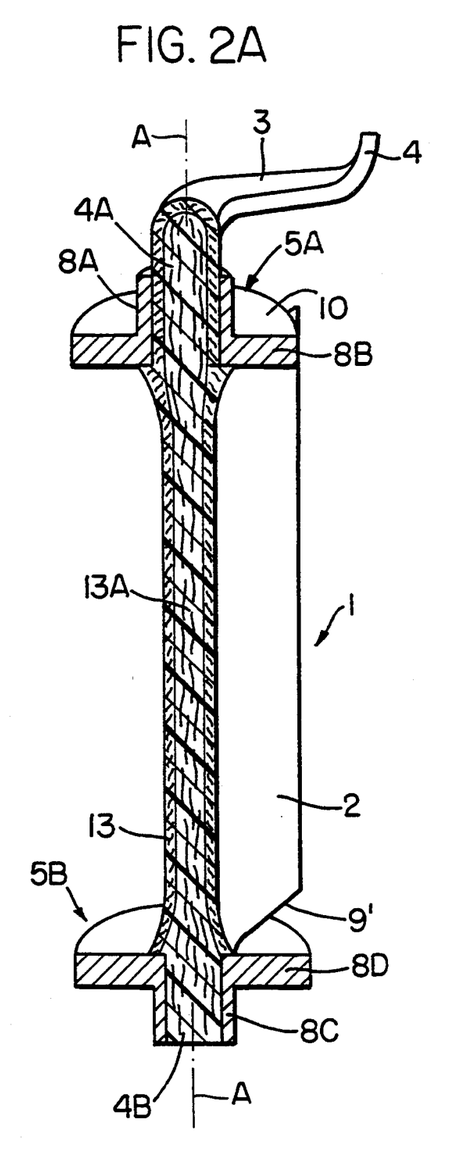
FIG. 2A is an axial sectional view of a blade with metal bearing bushings.
Figure 2B:
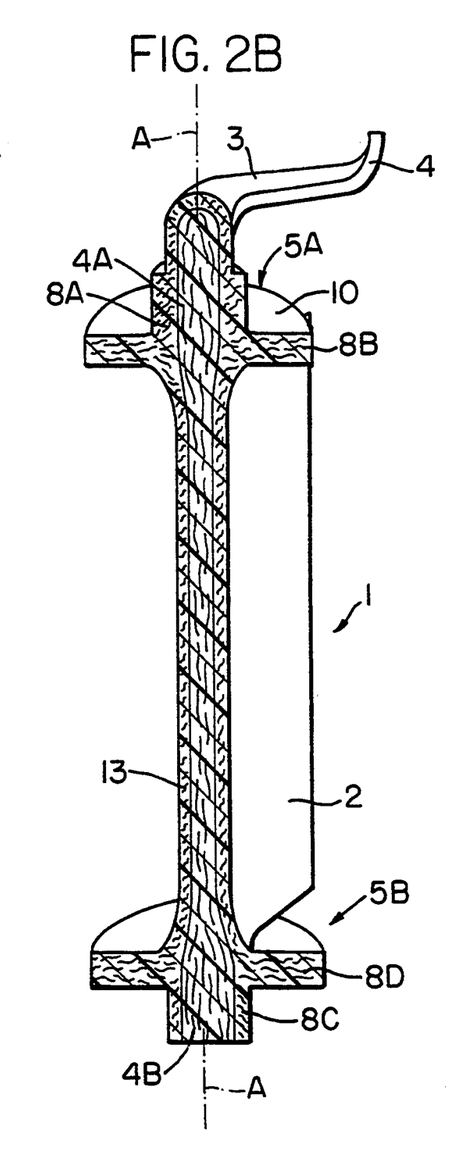
FIG. 2B is a view similar to that of FIG. 2A, however, with integral fiber composite bearing bushings.

The bearing bushings 5A and 5B are either separate metal elements as shown in FIG. 2A, or integrated fiber composite elements as shown in FIG. 2B. In both instances the bearing bushings 5A, 5B are molded to the guide vane, thereby forming a friction fit and a form fit bond with the respective bearing journal 4A, 4B. The bearing bushing 5A has an axially extending sleeve portion 8A and a radially extending flange portion 8B. The flange portion 8B has an upwardly facing bearing surface 10. The blade body 2 has an upwardly facing blade root 9. The bearing bushing 5B also has an axially extending sleeve 8C and a radially extending flange 8D. The term "axial" and "radial" has reference to the adjustment axis A—A. However, the adjustment axis A—A itself extends radially with regard to the rotational axis of an engine schematically shown in FIG. 3.

The bearing bushings 5A and 5B serve as bearings for the mounting of the guide vane 1 in a compressor housing 6, whereby the upper bearing bushing 5A is positioned near the stationary blades while the lower bearing bushing 5B is positioned in a bearing ring 7 (see FIG. 4) near the rotor. The stepped construction of the bearing bushings 5A, 5B serves for the proper mounting, whereby the flange 8B merges into the blade root 9 and the flange 8D merges into the blade root 9'. The bearing surfaces 10 face in axially opposite directions and are oriented to extend perpendicularly to the adjustment axis A—A.

The adjustment lever arm 3 forms an integral crank as an extension of the bearing journal 4A, whereby the crank extends preferably at about 90° to the axis A—A. The radially outer end of the lever arm 3 is provided with a female coupling bore 12 to be engaged by an adjustment pin of the adjustment ring 11 in the engine. Such a male pin is shown at 4C in FIG. 4. These pins are part of an adjustment ring 11 shown in FIG. 3. The central axis of the coupling bore 12 extends is in parallel to the adjustment axis A—A. The lever arm 3 serves on the one hand for transmitting the rotational motion of the adjustment ring 11 to bring the guide vane 1 into a tilted position to achieve the desired throttling of the flow. On the other hand, the arm 3 serves for transmitting the torque moment caused by the flow of the fluid through the engine into the adjustment ring 11. This torque moment is effective around the adjustment axis A—A.

Figures 3, 4:
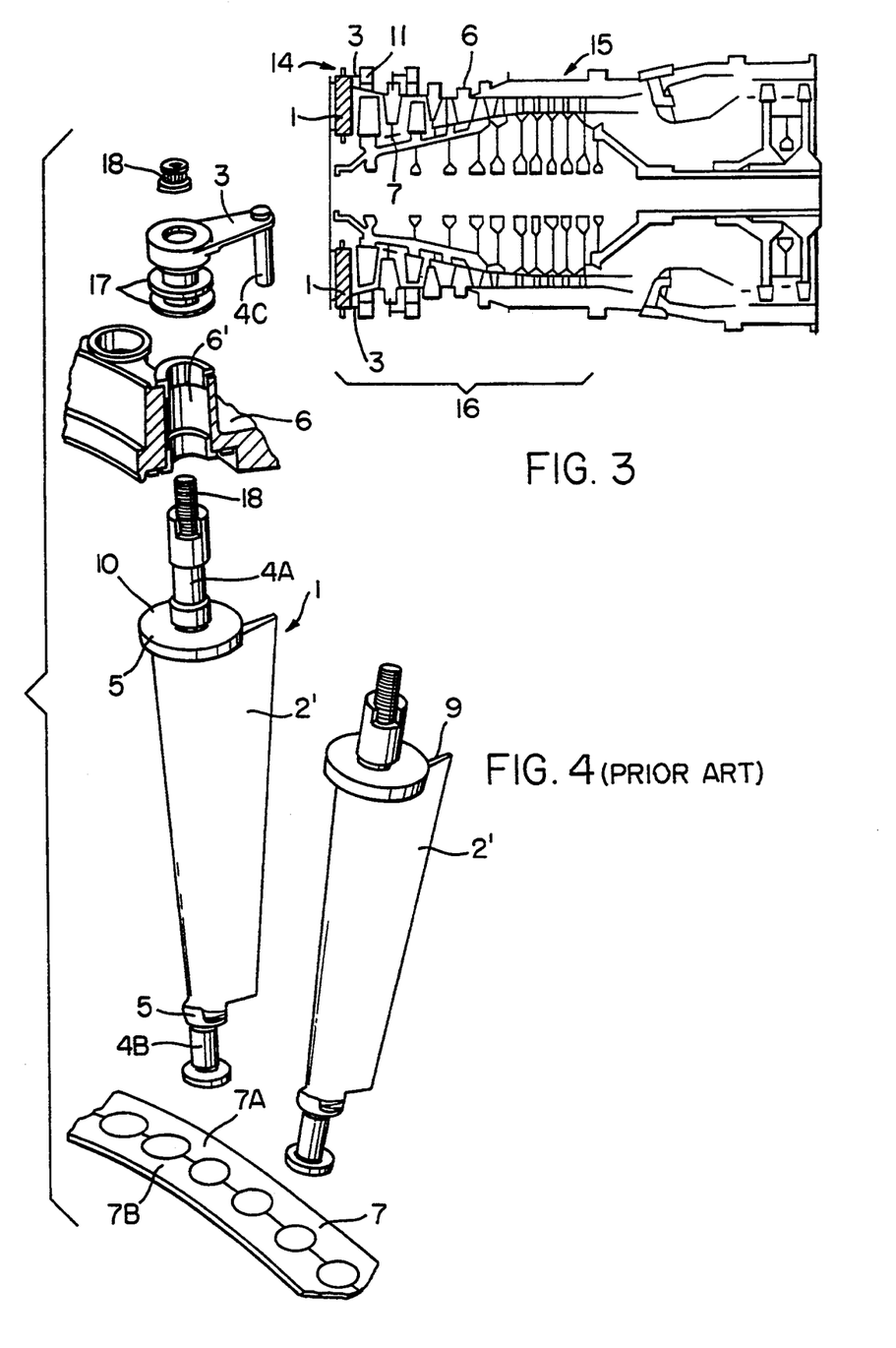
FIG. 3 is a schematic longitudinal sectional view through a gas turbine with an adjustable guide baffle in the compressor.
FIG. 4 is an exploded schematic view partially in section of a conventional multi-element guide vane for an axial guide baffle.

FIGS. 2A and 2B illustrate the internal structure of a fiber composite guide vane 1 according to the invention. The blade body 2 is a composite of carbon fiber fabrics embedded in a suitable resin matrix material and carbon fiber bundles also embedded in the matrix, whereby the blade jacket 13 has reinforcing fiber fabrics while the center or core 13A has reinforcing fiber bundles. The bearing bushings 5A and 5B in FIG. 2A are made of metal. The adjustment lever arm 3 merges integrally into the bearing journal 4A and is made of fiber tubes and rolled-up fiber fabrics with fiber bundles in the center. The fiber tubes comprise bi-directional fibers oriented in two directions. The fiber tubes enclose the fiber fabric and the fiber bundles. The orientation of the fibers in the outwardly located fiber tubes is about 45° relative to the adjustment axis A—A in the area of the bearing journal 4A. As a result, the fiber tubes are capable of optimally taking up the occurring torque moment while the fibers inside the bearing journals 4A and 4B, as well as inside the lever arm 3 are primarily oriented in the longitudinal direction to be better suited for taking up shear forces and bending moments. The fibers of the bearing journals 4A and 4B and of the lever arm 3 extend all the way into the blade body 2 and thus form with the fibers of the blade body 2, a rigid bonding. In FIGS. 2A and 2B the female-male coupling elements 12, 4C are reversed, More specifically, the lever arm 3 In FIGS. 2A and 2B is provided with a male coupling member or finger 4 that engages a respective hole the adjustment ring 11. FIG. 3 shows the ring 11 but not the detail of the holes engaged by the coupling finger 4. The guide baffle 14 of FIG. 3 holds a plurality of the guide vanes 1, whereby a mounting ring not shown comprises two sections which are then connected to each other, for example, by screws to encircle the bearing sleeves 8A of the blades 1.

The guide vanes 1 according to the invention which are made of fiber composite materials as mentioned above, are manufactured as follows. The fabric, fiber bundle, and the fiber tubes, are cut to size and inserted into a mold with the desired fiber orientation. The mold is divided, for example, along the central blade body plane. The fiber layers of the bearing journals 4A and 4B and of the lever arm 3 are so positioned that the fibers of these layers overlap with the reinforcing fibers of the blade body 2 from layer to layer. If desired, the fiber layers may be stitched together so as to fix their relationship relative to each other. Where the bearing bushings 5A and 5B are made of metal as shown in FIG. 2A, these bushings are also inserted into the mold in areas where the bearing journals 4A and 4B are to be formed. These bushings are placed onto the outer layer of the fibers that will form the respective bearing journals 4A and 4B. The following matrix curing bonds the bushings to the fibers.

Where the metal bearing bushings have been replaced by fiber composite material bearing bushings as in FIG. 2B, the mold is correspondingly formed and short and/or long fiber materials are respectively inserted into the mold as a single piece structure with the fibers of the remaining blade portions of the guide vane 1. The mold is then closed and relatively liquid matrix resin is injected into the mold while heat and pressure are applied. The resin is then permitted to cure. Upon completion of the curing the mold is opened and the finished guide vane 1 with its integrated bearing bushings 5A and 5B is removed from the mold. If necessary, the bearing bushings 5A and 5B can now be machined for achieving any desired final shape. It is also possible to use fiber prepregs that have been pre-impregnated with a resin material that has not yet been cured prior to insertion into the mold. These prepregs are assembled as described above.

Referring again to FIG. 3, guide vanes 1 according to the invention are assembled in an axial guide baffle 14 of a gas generator 15 for jet engines. The radially inner bearing journals 4B, 8C are mounted in a mounting ring, such as shown at 7 in FIG. 4. This mounting ring may have two sections 7A and 7B which are conventionally secured to each other. The radially outer end of the individual guide vanes 1, namely the bearing journal 4A, 8A is mounted to the compressor housing 6 of the gas generator 15, also with the help of a ring that is preferably a split ring or a half ring secured to the housing in such a way that receiving shells in the housing and in the ring together hold the bearing journals 4A, 8A. The mounting as such is conventional as shown in FIG. 4.

Since all the individual blades are connected through their lever arms 3 and through the coupling member 4 to the adjustment ring 11, a rotation of the ring 11 in one or the other direction adjusts the blade bodies 2 into the desired position for throttling or dethrottling of the flow through the compressor 16.

FIG. 4 shows a conventional assembly of conventional metal blades 2' which require a multitude of assembly elements such as washers 17, screw connections 18 and the like. Each of the blades 2' must be individually assembled at its radially outer end in respective bushings 6' in the housing 6 with the screw connections 18. The lower ends are assembled in the mounting ring 7 as mentioned. Incidentally, it is possible to manufacture the present integral guide vanes 1 with their blade body and adjustment lever arm as an integral component made of metal, whereby a forging operation, especially a drop forging operation, would be involved.

As mentioned, the guide vanes 1 are mounted with their radially outer end in bores of the metallic housing 6. Radially inwardly, that is next to the rotor, the guide vanes are mounted in respective bearing shells of the stator housing, for example, with the aid of the ring 7. In the preferred embodiment of FIG. 2A where the bearing journals 4A and 4B are encased by a metal bearing sleeve 8A and 8C, the metal bearing sleeve is rigidly bonded to the fiber composite material, but itself rotatably received in the respective mounting. This feature of the invention assures the required seal in the just described bearing or mounting structure, because a tight fit may be employed between the outer surface of the sleeves 8A and 8C on the one hand and the inner surface of the respective bearing housing shell in the housing. Such tight fit is still assuring the required low friction.

The second preferred embodiment of FIG. 2B which avoids any metal element, has the added advantage that problems that may occur due to different temperature expansion coefficients within the guide vane are entirely eliminated as the vane has no metal elements.

Figures 5, 6, 7, 8:
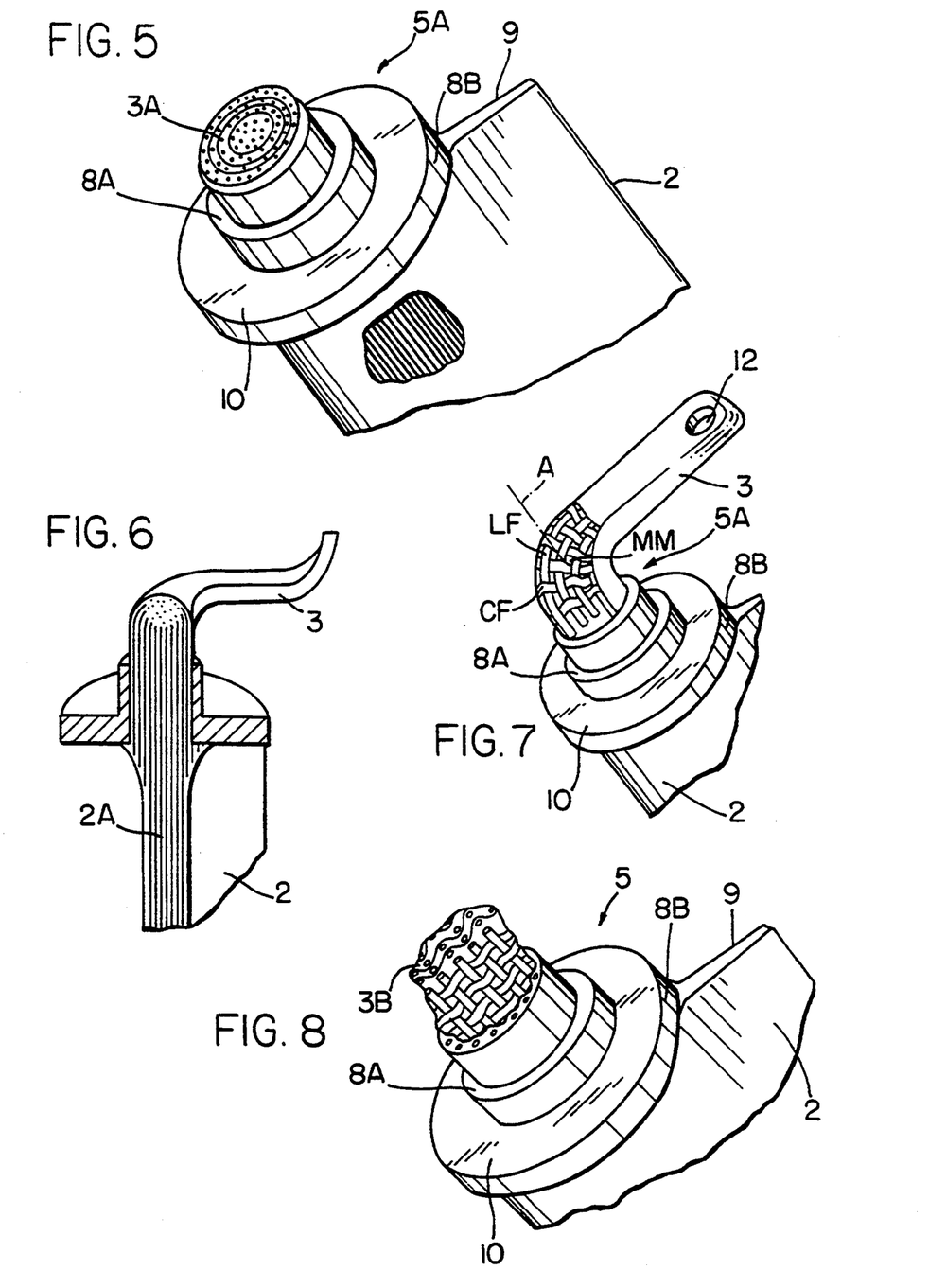
FIGS. 5 to 9 illustrate various fiber orientations in the present blade construction.

FIG. 5 shows that the fiber composite material of the adjustment lever 3 shown in FIG. 1 is formed as concentrically arranged fiber layer 3A including radially outer layers and radially inner layers, whereby a majority number of radially outer fiber layers extend from an outer end of the lever 3 into the vane or blade body 2.

FIG. 6 shows that she fibers 2A in the fiber bundles extend uni-directionally in the blade body 2.

FIG. 7 shows longitudinal fiber bundles LF braided with cross fiber bundles CF embedded in matrix material MM to form a three-dimensional bond between said braided reinforcing fiber bundles. The fiber bundles LF and CF extend in two different directions, thus these fibers extend bi-directionally.

FIG. 8 shows fibers 3B of the adjustment lever 3 as three-dimensionally braided fiber material extending substantially longitudinally in the adjustment lever 3.

Figure 9:
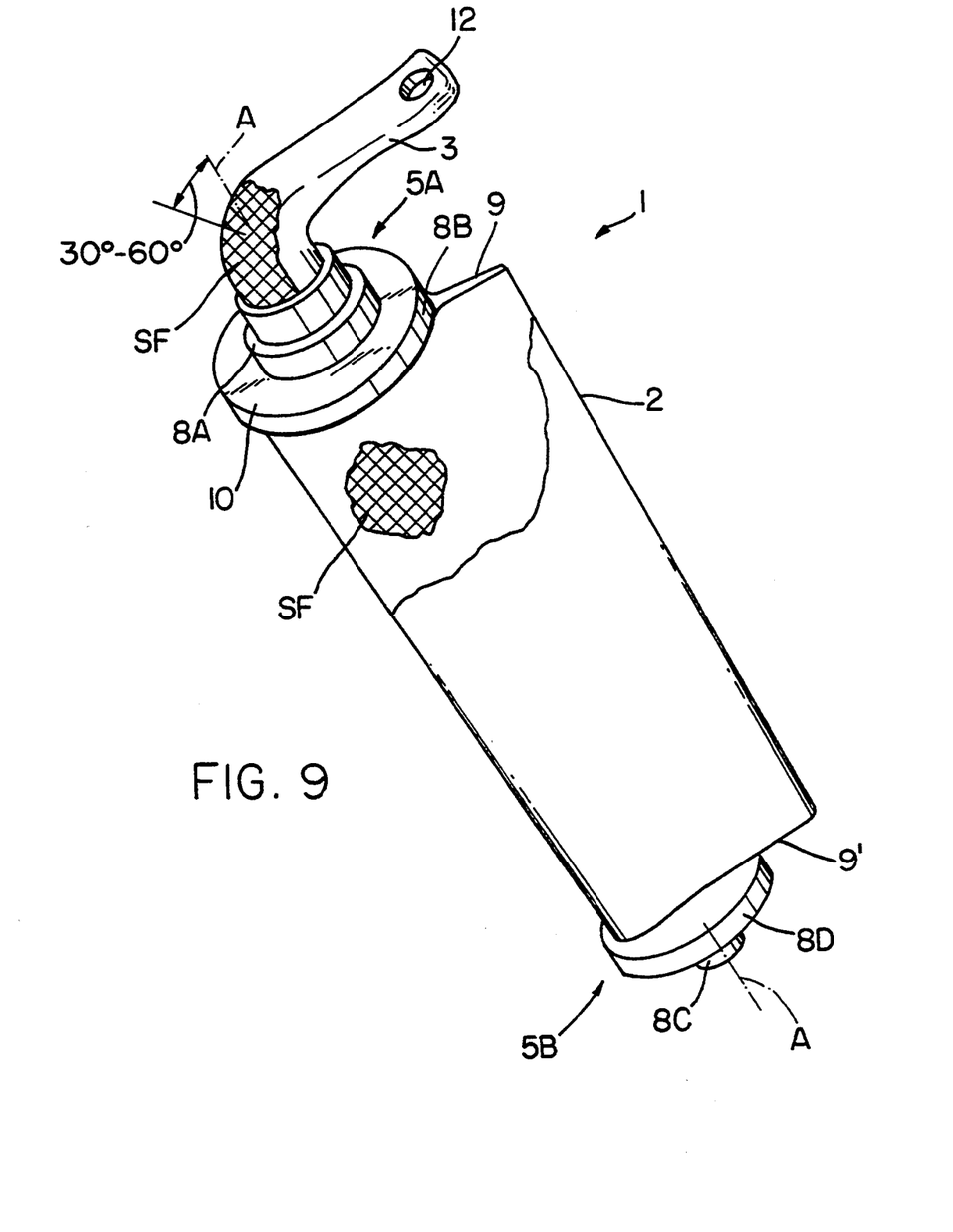

In FIG. 9 the slanting fibers SF of the fiber composite material extend at an angle to the adjustment axis A—A, whereby the respective angle is within the range of 30° to 60°.

Although the invention has been described with reference to specific example embodiments, it will be appreciated that it is intended to cover all modifications and equivalents within the scope of the appended claims.

What we claim is:

1. An adjustable guide vane for an axial guide baffle of an axial flow engine having a rotational axis, comprising a guide vane body having a longitudinal adjustment axis extending radially relative to said rotational axis of said engine, an adjustment lever (3) extending at an angle away from said adjustment axis and forming an integral one piece component with said vane body, said integral one piece component comprising at least one bearing journal positioned at an axially outer end of said integral one piece component, said bearing journal extending coaxially to said adjustment axis, said adjustment lever merging into said bearing journal, said vane body, bearing journal and lever being made of a fiber composite material so that fibers of said adjustment lever extend at least partly into said vane body to form a composite bond with fibers in said vane body.

2. The adjustable guide vane of claim 1, wherein said fiber composite material comprises a resin matrix material and braided reinforcing fiber bundles embedded in said resin matrix material to form a three-dimensional bond between said braided reinforcing fiber bundles.

3. The adjustable guide vane of claim 2, wherein said reinforcing fibers extend unidirectionally in said fiber bundles.

4. The adjustable guide vane of claim 2, wherein said reinforcing fibers extend bi-directionally in said fiber bundles.

5. The adjustable guide vane of claim 1, wherein said fiber composite material of said adjustment lever comprises three-dimensionally braided fiber material in which fibers extend substantially in a longitudinal direction of said adjustment lever.

6. The adjustable guide vane of claim 1, wherein said fiber composite material of said adjustment lever comprises fiber material forming concentrically arranged fiber layers including outer fiber layers and inner fiber layers, whereby a number of said outer fiber layers extend from an outer end of said adjustment lever into said vane body.

7. The adjustable guide vane of claim 6, wherein said fiber material of said adjustment lever comprises fiber material tubes arranged concentrically with fibers of said inner fiber layers having a fiber orientation predominantly in a longitudinal direction of said adjustment lever.

8. The adjustable guide vane of claim 6, wherein said fiber material of said adjustment lever comprises fiber material layers arranged concentrically with fibers of said inner fiber layers having a fiber orientation predominantly in a longitudinal direction of said adjustment lever.

9. The adjustable guide vane of claim 1, wherein said fiber composite material of said at least one bearing journal comprises slanting reinforcing fibers that extend at an angle to said adjustment axis, said angle being within the range of 30° to 60°.

10. The adjustable guide vane of claim 9, wherein said slanting reinforcing fibers are positioned radially outwardly in said bearing journal relative to said adjustment axis.

11. The adjustable guide vane of claim 1, further comprising a metal bearing bushing, said at least one bearing journal extending through said metal bearing bushing.

12. The adjustable guide vane of claim 1, further comprising at least one fiber composite bearing bushing, said at least one bearing journal extending through said fiber composite bearing bushing so that fibers of said fiber composite bearing bushing, fibers of said bearing journal, and fibers of said vane body form a fiber composite bond.

13. The adjustable guide vane of claim 12, wherein said fiber composite bearing bushing comprises a flange portion, said vane body having a blade root merging at least partly into said flange portion.

14. The adjustable guide vane of claim 1, wherein said angle is an about 90° angle.

15. The adjustable guide vane of claim 1, wherein said adjustment lever forms an integral crank as an extension of said bearing journal.

* * * * *

UNITED STATES PATENT AND TRADEMARK OFFICE
CERTIFICATE OF CORRECTION

PATENT NO. : 5,380,152

DATED : January 10, 1995

INVENTOR(S) : Sikorski et al.

It is certified that error appears in the above identified patent and that said Letters Patent is hereby corrected as shown below:

On title page,
in [56] References Cited
U.S. PATENT DOCUMENTS
--5,039,277  8/1991   Naudet ...-- should be added.

in [56] FOREIGN PATENT DOCUMENTS
"954637" should have a date of --6/1956--.

Column 1, line 62, "Like," should be --like,--.

Column 4, line 8, "Fig," should be --Fig.--;
line 32, "aim" should be --arm--.

Column 5, line 50, "reversed," should be --reversed.--.

Column 7, lines 19 and 20, "majority" should be --substantial--;
line 22, "she" should be --the--.

Signed and Sealed this

Twenty-fifth Day of April, 1995

*Attest:*

BRUCE LEHMAN

*Attesting Officer*    *Commissioner of Patents and Trademarks*